United States Patent [19]
Barkelew

[11] 3,727,637
[45] Apr. 17, 1973

[54] REPLACEABLE COMBINATION VALVE SEAT AND FLOW DIVERTER

[76] Inventor: Richard C. Barkelew, Post Office Box 1415, Carmel, Calif.

[22] Filed: Jan. 3, 1972

[21] Appl. No.: 214,774

[52] U.S. Cl. .................137/561, 137/119, 137/467, 137/597, 251/360, 4/148
[51] Int. Cl. .................................................A47k 4/00
[58] Field of Search....................137/561, 610, 119, 137/597, 467, 454.2, 533.15; 4/148; 251/360

[56] References Cited

UNITED STATES PATENTS

| | | | |
|---|---|---|---|
| 1,978,340 | 10/1934 | Clement | 251/360 X |
| 2,344,041 | 3/1944 | Hoke et al. | 251/360 |
| 2,663,539 | 12/1953 | Kersten et al. | 137/467 |
| 2,985,424 | 5/1961 | Anderson et al. | 251/360 X |
| 3,012,251 | 12/1961 | Fife | 137/597 X |
| 3,051,196 | 8/1962 | Miller | 251/360 X |
| 3,601,141 | 8/1971 | Kishu | 137/597 X |

*Primary Examiner*—William R. Cline
*Attorney*—Forrest J. Lilly

[57] ABSTRACT

A valve has a valve seating shoulder with an easily replaceable seat held in position adjacent thereto by a special non-circular snap ring, portions of which engage in an annular groove around the liquid passage, and portions of which protrude out of said groove, and over a groove in the rear face of the seat, enabling the snap ring to be easily pried free by use of a suitable tool engaged in the last mentioned groove and forced against the overlapping portion of the ring.

The seat has integral therewith a barrel which passes liquid into a liquid passage and directs it at right angles toward a preselected one of two outlets. The barrel has a non-circular cross section, and is removably but non-rotatably receivable in either of two positions in a mating non-circular aperture in a flange which also provides the aforesaid valve seat shoulder. In one position, the barrel directs water toward one of the outlets, and in the second position, toward the other. The barrel and seat may be readily removed from this aperture, either to inspect or repair the seat, or to reinstall it in the alternative position with the barrel directing the water toward the other outlet.

10 Claims, 5 Drawing Figures

PATENTED APR 17 1973　3,727,637

REPLACEABLE COMBINATION VALVE SEAT AND FLOW DIVERTER

BACKGROUND OF THE INVENTION

1. Field of the Invention

This invention relates generally to replaceable seats for fluid valves, illustratively, though not limitedly, of a type such as are used in plumbing installations for controlling water flow to bath tubs, showers, or both, and to diverters used to direct the flow of water to a selected one of a plurality of outlets leading, e.g., one to a bath tub, and the other to a shower.

In the past, the replacement of the seat of such a valve has presented some difficulty, and one purpose of the invention is substantial improvement in this regard.

2. Description of the Prior Art

In the past, particularly in valves having one inlet, an interior passage, with a control valve member therein, and two outlets, one leading to a shower head, and the other to a tub, there is often provided a so-called diverter, to direct the water toward one or the other of the outlets. The selected outlet should normally lead to the tub. A diverter or valve closure in the outlet to the tub, if open, then allows discharge to the tub; if closed, the water rises in the pipe above this closure, through the valve, i.e., in the tub outlet and out the shower outlet, and thus feeds the shower head. Such a valve is usually installed inside a bathroom wall behind plaster or tile. Unfortunately, it is not uncommon for such a valve to be installed upside down, with the diverter directed upwards towards the shower. The water then, regardless of the position of the diverter or closure at the tub, flows upwards and discharges from the shower head. The only possible correction is to tear a hole in the plaster or tiled wall, so as to expose plumbing, and then reinstall the valve right side up. This amounts to a major, costly, correction, but regardless of cost, it must be made. In practice, this happens often enough to justify a material effort to provide for a simple, inexpensive correcting procedure.

A primary purpose and accomplishment of the present invention is to provide such a valve with a diverter which, in such a case, can be easily removed, along with the valve seat, through the tubular valve body part going through the wall, turned over into its correct position, and then reinserted.

SUMMARY OF THE INVENTION

The invention first provides a valve seating shoulder within the valve body, a removable annular valve seat adapted to engage this shoulder, and a special, quick-removable, snap ring for retaining the seal against the seating shoulder. The diverter is formed integrally with the removable seat, and this combined seat and diverter can, after removal of the snap ring, be retracted a short distance, turned over a half turn, and reinserted. Means are provided whereby the seat and diverter can be inserted in either of two positions, generally 180° apart, with the diverter pointed towards either outlet. Thus if the valve is installed first with the diverter pointed towards one outlet, withdrawal of the seat and diverter, rotation of a half turn, and reinsertion will correct the entire problem. Considering the frequency with which this error is made in the field, the slight cost of the present provision of a simple correction for this contingency is economically well justified.

DESCRIPTION OF AN ILLUSTRATIVE EMBODIMENT

Figure 1:
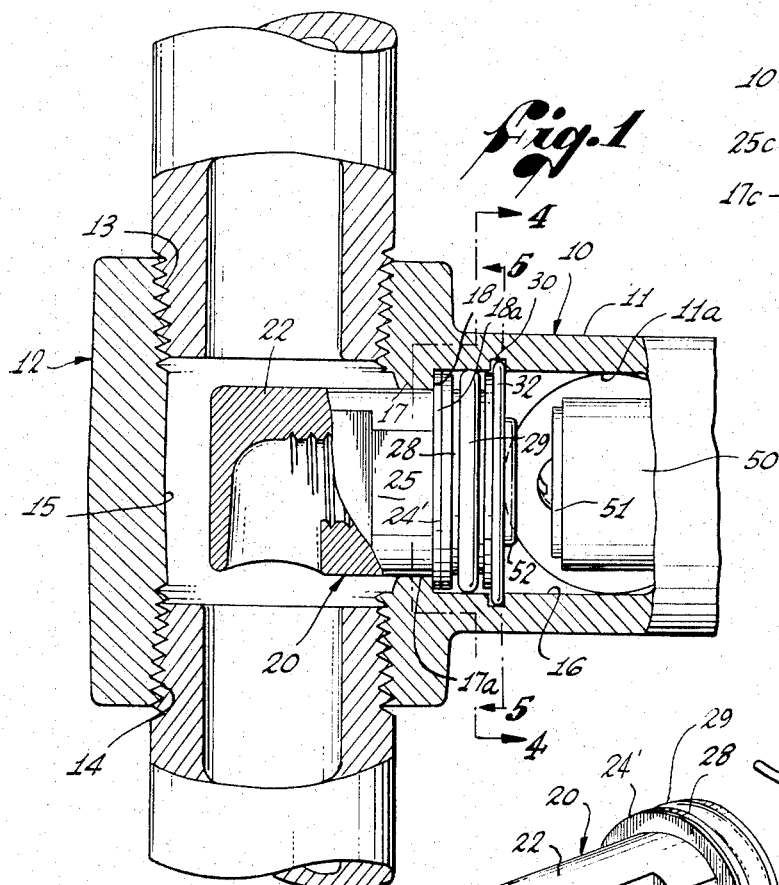
FIG. 1 is a longitudinal section through the valve, with parts in elevation.
Figure 4:
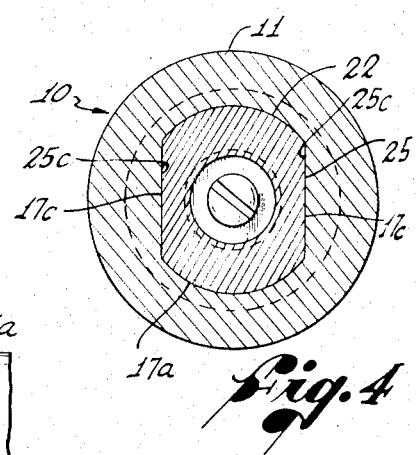
FIG. 4 is a section on broken line 4—of FIG. 1.
Figure 2:
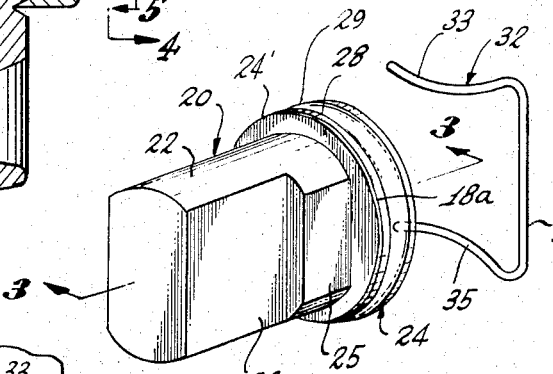
FIG. 2 is a perspective exploded view of the valve seat, snap ring, and diverter.
Figure 5:
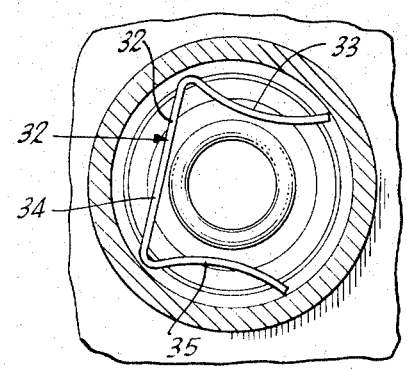
FIG. 5 is a section on line 5—5 of FIG. 1.
Figure 3:
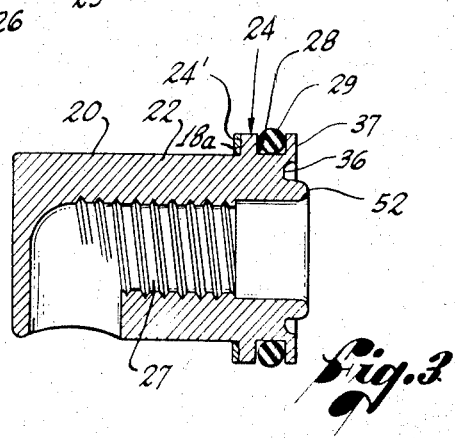
FIG. 3 is a section on line 3—3 of FIG. 2.

The valve body 10 is shown with commonly known parts broken away for simplicity of disclosure. A horizontal tubular body part 11, with a water inlet 11a to receive water under service pressure, and which is adapted to have a bathroom wall closed around it, has a vertical tubular body 12, in the form of a Tee head, at one end, with an upper internally threaded outlet 13, and a lower internally threaded outlet 14. At this point it should be parenthetically stated that while for convenience herein and in the claims, I may sometimes use adjectives such as horizontal, upper, lower, etc., these are to denote relationships between parts only, and constitute no limitation on the invention in either the specification or claims. Between the two outlets 13 and 14 the Tee head has a bore 15, intersected by the bore 16 of tubular body part 11. As shown, the bores 15 and 16 are about the same diameter, and between them is an integral internal flange 17 affording a seating shoulder 18.

Inside the shoulder 18 the flange 17 has an aperture 17a which is non-circular, but of a certain symmetry as will appear. In the illustrative embodiment, the aperture 17a is rounded at top and bottom, about the center of a circle, and has vertical chordal flats 17c at its opposite sides.

A combined diverter and valve seat 20 comprises a barrel 22, with a collar 24 at one end. The collar has a shoulder 24' adapted to seat on seating shoulder 18, or on a sealing washer 18a on said shoulder. The washer 18a should, of course, have an interior opening conforming to that of the aperture 17a. Projecting beyond collar 24, the barrel 22 is circular top and bottom, but has opposite parallel vertical flats 25, and the aperture 17a through flange 17 closely, but with an easy sliding fit, receives the rounded upper and lower sides of the barrel 22, and includes parallel, chordal flat surfaces 25c which similarly receive the flats 25. Beyond the flats 25, the barrel 22 has deeper cut flats 26, which enlarge the liquid flow passage of bore 15 past the diverter 20.

The collar 24 and barrel 22 have therein an axial fluid flow port 27 which opens through the collar at one end, and in the other direction leads to the extremity of the barrel 22, where it turns laterally and is directed either up or down, depending upon its orientation relative to the flats in the flange 17. The central portion of the port has screw-threads, as indicated, for a purpose to be described hereinafter.

Collar 24 preferably has a peripheral groove 28 for reception of O-ring seal 29, the latter sealing with the bore 16. Immediately in front of the collar 24, there is sunk in the wall of tubular part 10, i.e., outside the bore 16, an annular groove 30 for a snap ring 32. Broadly, this snap ring could be conventional, its purpose being simply to hold the seat releasably adjacent the washer 18a on the seating shoulder 18. However, I prefer to use a special snap ring 32, made up of a piece of spring wire formed into three segments 33, 34 and 35, of which the middle segment 34 is in this case straight, and the two end segments are arcuate, the radius of curvature, and the acute angle between segments being preferably as shown in the drawings. In normal in-place expanded position, the junctures of adjacent segments and the free ends of the arcuate segments are expanded into the internal annular groove 30. Intermediate portions of the snap ring segments remain outside the groove 30, and overlie or intersect an annular groove or channel 36 sunk into the annular front collar face 37. The snap ring so formed can be easily inserted in the groove 30, after the diverter and seat have been positioned, by simply squeezing on the two ends of the ring until the ring is contracted sufficiently to enter the bore 16. When thus positioned opposite the groove 30, the ring will snap or expand into locking position. Later, to extricate the snap ring, any small tool, such as a screwdriver, can be used, in cooperation with the channel 36, to pry the ring out of the groove 30.

With the snap ring removed, the seat and diverter 20 can be easily removed through valve body part 11 by screwing a bolt (not shown) into the threaded bore or port 27 in the barrel 22, and then simply pulling the barrel out by means of the bolt.

To complete the description of the valve structure, numeral 50 designates the valve member axially movable along tubular housing part 11 by any suitable or conventional means, not here shown because of its common nature. Thus the valve 50 may have a lead screw connection with a stem means including an extremity projecting through a bonnet on the part 11 and which is rotatable by an external handle. The end of valve member 50 carries a washer 51, which engages a raised bead 52 on the rear end of seat collar 28, around port 27, and so presses the seat into tight sealing engagement with seating shoulder 18. A good water-tight seal can thus be achieved. The pressure of the water on the exposed area of the seat of course assures a water-tight seal when the valve 50 is opened. If desired, the O-ring seal can be used additionally, or alternatively, and the double seal is preferred.

I have provided a valve seat which can be removed for inspection or replacement with exceptional ease. When the valve 50 is closed against bead 52, the seal at 18 is effective both by reason of the force exerted by the valve 50 and the pressure of the water on the seat area around the valve. When the valve 50 is retracted, the seal at shoulder 18 is effective by virtue of the water pressure against the entire exposed end area of the collar 24. O-ring seal 29 of course seals between collar 24 and bore 16 in the usual manner. I have also combined this easily removable seat with a quickly removable diverter barrel 22, which receives an axial flow of water when the valve 50 is retracted, turns is through 90°, and discharges it toward and through one or the other of the two outlets 13 and 14 depending upon the direction in which it is pointed. In general, in a tub-shower installation, this should be downward, to go through the tub spout, in the common manner. Closure of a diverter valve in this spout then causes the pipe between the valve and the tub spout to fill, and the water then flows up in the valve bore 15, by-passing the diverter in barrel 22, to discharge via the upper outlet and so flow on to the shower head.

The diverter can be reversed in direction by a simple operation, in the event it is installed initially with the wrong flow direction, by simply removing the valve 50, pulling the relatively loosely fitting valve seat and diverter member back out of the aperture 17a, in back of seating shoulder 18, rotating it a half turn, and pushing it back in place.

It will be understood that various changes in design, construction and arrangement may be made without departing from the spirit and scope of the appended claims.

I claim:

1. In a fluid valve, the combination of:
a valve body comprising a first tubular portion having a fluid inlet thereto and a fluid passage therein leading from said inlet to one end thereof, and a second tubular portion having a continuous fluid passage therethrough between outlets at its opposite ends, said end of said first tubular portion intersecting said second tubular portion between the outlets of said second tubular portion;
a seating shoulder around said fluid passage of said first tubular portion at said end thereof, said seating shoulder facing upstream of said first tubular portion, and there being an aperture in said first tubular portion located inside said shoulder and leading from said fluid passage in said first tubular portion into said fluid passage in said second tubular portion;
a valve seat positioned in said first tubular portion adjacent said seating shoulder; and
a diverter barrel integral with said valve seat, and projecting from said seat through said aperture with a free fit and into said fluid passage between said outlets of said second tubular portion, said seat and barrel having a fluid passage extending longitudinally therethrough axially of said first tubular portion and then turned through an angle near the extremity of the barrel to direct the fluid flow therefrom toward a selected outlet;
said seat and diverter barrel being adjustable relative to said seating shoulder and aperture to occupy a selected one of a plurality of predetermined, angularly spaced-apart positions, including two positions in which the diverter directs the fluid flow toward a selected one or the other of said outlets.

2. The subject matter of claim 1, wherein said aperture and the portion of said barrel received therein are non-circular but complementary in contour to one another and so as to mate in either of said two selected positions.

3. The subject matter of claim 2, wherein said aperture and the portion of the barrel received therein are defined by two opposite equal arcs of a circle and two parallel, chordal, flats equidistant from the center of said circle, so that said barrel fits said aperture only in either of two positions located 180° apart.

4. The subject matter of claim 1, wherein said diverter barrel projecting into the fluid passage in said second tubular valve body portion occupies only a portion of the cross sectional area of said last mentioned passage whereby to permit fluid flow therethrough inwardly through one outlet, past said barrel, and outwardly through the other outlet.

5. The subject matter of claim 4, including quick-releasable means for positioning said seat and diverter barrel adjacent to said seating shoulder.

6. The subject matter of claim 1, wherein said fluid passage in said first tubular valve body portion comprises a cylindrical bore around said valve seat, a circumferential groove in said bore, and a spring snap ring with portions engageable in said groove and portions engageable with the side of said valve seat opposite from said seating shoulder, said side of said valve seat, at a location adjacent to an overlying portion of said snap ring, being recessed to receive a prying tool therein for easy ejection of the snap ring.

7. The subject matter of claim 6, wherein the spring snap ring comprises a spring wire of three segments joined by acute angled bends affording two junctions and two free ends adapted to engage in said groove, and intermediate portions engaging said valve seat.

8. In a valve, a retaining means for a valve seat engageable with a seating shoulder around the inside of a cylindrical fluid passage of said valve, comprising:
- a circumferential groove in said bore in a plane near to the side of said valve seat opposite from said seating shoulder;
- a spring snap ring with portions engageable in said groove and portions engageable with the side of said valve seat opposite from said seating shoulder; said side of said valve seat, at a location adjacent to an overlying portion of said snap ring, being recessed to receive a prying tool therein for easy ejection of the snap ring.

9. The subject matter of claim 8, wherein the spring snap ring comprises a spring wire of three segments joined by acute angled bends affording two junctions and two free ends adapted to engage in said groove, and intermediate portions engaging said valve seat.

10. The subject matter of claim 1, wherein said passage through said valve seat and diverter barrel comprises an internally screwthreaded bore.

* * * * *